United States Patent
Luo et al.

(10) Patent No.: US 12,477,357 B2
(45) Date of Patent: Nov. 18, 2025

(54) HIERARCHICAL PROXY DEPLOYMENT METHOD

(71) Applicant: UNIVERSITY OF ELECTRONIC SCIENCE AND TECHNOLOGY OF CHINA, Chengdu (CN)

(72) Inventors: Long Luo, Chengdu (CN); Hongfang Yu, Chengdu (CN); Gang Sun, Chengdu (CN); Chongxi Ma, Chengdu (CN); Qingwei Ji, Chengdu (CN); Linjian Yu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 493 days.

(21) Appl. No.: 17/973,553

(22) Filed: Oct. 26, 2022

(65) Prior Publication Data
US 2024/0015528 A1    Jan. 11, 2024

(30) Foreign Application Priority Data
Jul. 11, 2022    (CN) .......................... 202210812043.4

(51) Int. Cl.
  *H04W 24/02*    (2009.01)
  *H04W 24/10*    (2009.01)
  *H04W 88/18*    (2009.01)
(52) U.S. Cl.
  CPC .......... *H04W 24/02* (2013.01); *H04W 24/10* (2013.01); *H04W 88/182* (2013.01)

(58) Field of Classification Search
  CPC ..................................................... H04L 43/00
  See application file for complete search history.

(56) References Cited

U.S. PATENT DOCUMENTS

| | | | |
|---|---|---|---|
| 2005/0005024 A1* | 1/2005 | Samuels | H04L 67/56 709/238 |
| 2005/0091399 A1* | 4/2005 | Candan | H04L 65/1101 709/240 |
| 2021/0120468 A1* | 4/2021 | Stauffer | H04W 36/00698 |
| 2022/0286494 A1* | 9/2022 | Zheng | H04L 63/0281 |
| 2022/0417826 A1* | 12/2022 | Albasheir | H04W 40/18 |
| 2023/0379398 A1* | 11/2023 | Su | H04L 47/6215 |
| 2025/0016644 A1* | 1/2025 | Panchal | H04W 76/12 |

* cited by examiner

*Primary Examiner* — Marcus Smith
*Assistant Examiner* — Rowan K Fakhro
(74) *Attorney, Agent, or Firm* — Bayramoglu Law Offices LLC

(57) ABSTRACT

A hierarchical proxy deployment method includes: performing information collection and information interaction in a hierarchical proxy deployment architecture to obtain bandwidths and latencies of all inter-node communication links; and selecting an optimal proxy deployment solution from all feasible proxy deployment solutions based on the bandwidths and latencies of all the inter-node communication links. According to the method, a hierarchical proxy deployment architecture is used. An optimal proxy deployment solution is formed by selecting the optimal location and the optimal number of proxies for deployment to meet the transmission performance requirement of network applications in 5G/B5G networks. Therefore, transmission performance requirements are satisfied by a proxy deployment with a minimized number of proxies, thereby reducing network overheads and resource waste.

7 Claims, 3 Drawing Sheets

HIERARCHICAL PROXY DEPLOYMENT METHOD

CROSS REFERENCE TO THE RELATED APPLICATIONS

This application is based upon and claims priority to Chinese Patent Application No. 202210812043.4, filed on Jul. 11, 2022, the entire contents of which are incorporated herein by reference.

TECHNICAL FIELD

The present disclosure relates to the field of communications, specifically to a hierarchical proxy deployment method.

BACKGROUND

Millimeter wave (mmWave), which has abundant spectrum resources, can provide great bandwidth and an ultra-high data transmission rate, therefore, it is considered as an important enabling technology for the fifth generation (5G) and beyond 5G (B5G) network. The mmWave technology can achieve higher bandwidth, lower latency, and larger capacity, thereby supporting new network services such as 360° video/AR/VR, autonomous driving, telemedicine, and massive machine-type communications. However, using high-frequency mmWave technology in a network faces many serious challenges. Since mmWave links trend to be very sensitive to blocking conditions (such as a building, a tree, or a human body) and LOS-NLOS switching, the channel capacity may fluctuate significantly in a short period of time, which impacts the upper-layer transport protocols as well as the end-to-end transmission performance and results in a decrease in the availability and data transmission rate of an application service.

An effective means to improve the end-to-end transmission performance of a 5G/B5G network is to deploy Performance-Enhancing Proxy (PEP) in the network, such as a splitting PEP (SPEP). Currently, the splitting PEP (SPEP) is usually deployed in the wireless network to enhance the transmission performance of wireless links. Existing proxy deployment solutions usually deploy a predetermined number of proxies (e.g., one proxy) on some specific network nodes (e.g., base stations), as shown in FIG. 1. It is easy to learn that existing proxy deployment solutions are inflexible in terms of the number and the location of the deployed proxies, which may greatly limit the enhancement of the network transmission capacity. This causes the failure to meet the transmission performance requirement of application flows in 5G/B5G networks.

SUMMARY

To overcome the above-mentioned defects of the prior art, the present disclosure provides a hierarchical proxy deployment method to resolve the following problems:

1. how to design a proxy deployment architecture capable of effectively enhancing the transmission performance for 5G/B5G network scenarios, thereby meeting the increasingly stringent transmission performance requirements of 5G/B5G network applications, such as higher bandwidth and data transmission rate and lower latency; and
2. how to use the proposed hierarchical architecture to design a better proxy deployment solution for satisfying the transmission performance requirement of a particular service flow in 5G/B5G networks by optimizing the number of proxies and their deployment locations.

To achieve the above inventive objectives, the present disclosure adopts the following technical solutions: A hierarchical proxy deployment method is provided, including the following steps:

S1: performing information collection and information interaction in a hierarchical proxy deployment architecture to obtain bandwidths and latencies of all inter-node communication links, and S2: selecting an optimal proxy deployment solution from all feasible proxy deployment solutions based on the bandwidths and latencies of all the inter-node communication links.

Further, the hierarchical proxy deployment architecture in step S1 includes a secondary base station node SN, a master base station node MN, a cloud proxy node CN, and a long connection proxy node LN.

The secondary base station node SN sits between the master base station and the user equipment (UE) node, and it establishes a communication connection with the master base station node MN and the user equipment (UE), respectively. The master base station node MN establishes a communication connection with the cloud proxy node CN. The cloud proxy node CN establishes a communication connection with the long connection proxy node LN. A service server Server establishes a communication connection with the master base station node MN, the cloud proxy node CN, and the proxy node LN, respectively.

Further, the cloud proxy node CN includes a plurality of cloud proxy sub-nodes, and the long connection proxy node LN includes a plurality of long connection proxy sub-nodes, and each cloud proxy sub-node establishes a communication connection with the master base station node MN and a persistent communication connection with each long connection proxy sub-node separately. The server Server establishes a communication connection with each cloud proxy sub-node and each long connection proxy sub-node, respectively.

Further, step S1 includes the following sub-steps:

S11: collecting bandwidths and latencies of communication links between all adjacent nodes in the hierarchical proxy deployment architecture by using the master base station node MN, the cloud proxy node CN, and the long connection proxy node LN in the hierarchical proxy deployment architecture, and S12: notifying all nodes of the bandwidths and latencies of all the communication links by using the master base station node MN, the cloud proxy node CN, and the long connection proxy node LN.

Further, step S2 includes the following sub-steps:

S21: selecting a set of feasible candidate solutions from all the possible proxy deployment solutions based on the bandwidths and latencies of all the communication links; and S22: selecting the optimal proxy deployment solution from the set of candidate solutions.

Further, step S21 includes the following sub-steps:

S211: enumerating all the possible proxy deployment solutions according to an enumeration method after the user equipment UE sends a service request to the server Server;

S212: obtaining the achievable transmission performance, including the minimum throughput of the communication links and the time to first byte TTFB, of every possible proxy deployment solution based on the bandwidths and latencies of all the communication links, and S213: excluding the proxy deployment solutions whose transmission performance cannot meet the transmission performance requirements of network applications, and generating the set of feasible candidate solutions comprising the rest possible proxy deployment solutions.

Further, a calculation formula of the time to first byte TTFB in step S212 is:

$TG=2D+2 \max(D_i)$, where

TG denotes the time to first byte TTFB, D denotes the delay of the entire end-to-end transmission link, and $D_i$ denotes a delay of a link between every two adjacent nodes.

Further, step S22 includes the following sub-steps:

S221: in a case that a proxy deployment with minimizing the number of proxies and network overheads as the goal, selecting, from the set of candidate solutions, the proxy deployment solutions with the smallest number of proxies and network overhead to obtain a first filtered set;

S222: in a case that the cloud proxy node CN is taken as a condition, selecting, from the first filtered set, the proxy deployment solutions that pass the cloud proxy node CN to obtain a second filtered set;

S223: in a case that the long connection proxy node LN is taken as a condition, selecting, from the second filtered set, the proxy deployment solutions that do not use persistent connection between CN and LN to obtain a third filtered set; and S224: selecting one proxy deployment solution, namely, the optimal proxy deployment solution from the third filtered set.

In conclusion, the present disclosure has the following beneficial effects:

1. The present disclosure provides a hierarchical proxy deployment manner that is novel and flexible. In this manner, transport proxies can be deployed in a hierarchical fashion, such that more possibilities in the number and locations of proxies are provided for deployment. This hierarchical proxy deployment manner can enhance the network transmission capacity more effectively, thereby meeting the transmission performance requirement of application flows in 5G/B5G networks.

2. The above hierarchical proxy deployment architecture is used in the present disclosure, and an optimal proxy deployment solution is formed by selecting the optimal locations and number of proxies for deployment to meet the transmission performance requirement of application flows in 5G/B5G networks. Moreover, the number of deployed proxies is minimized on the premise that the transmission performance requirement is met, thereby reducing network overhead and resource waste.

DETAILED DESCRIPTION OF THE EMBODIMENTS

The specific embodiments of the present disclosure are described below to facilitate those skilled in the art to understand the present disclosure, but it should be clear that the present disclosure is not limited to the scope of the specific embodiments. Various changes made by those of ordinary skill in the art within the spirit and scope of the present disclosure defined by the appended claims should fall within the protection scope of the present disclosure.

Figure 1:
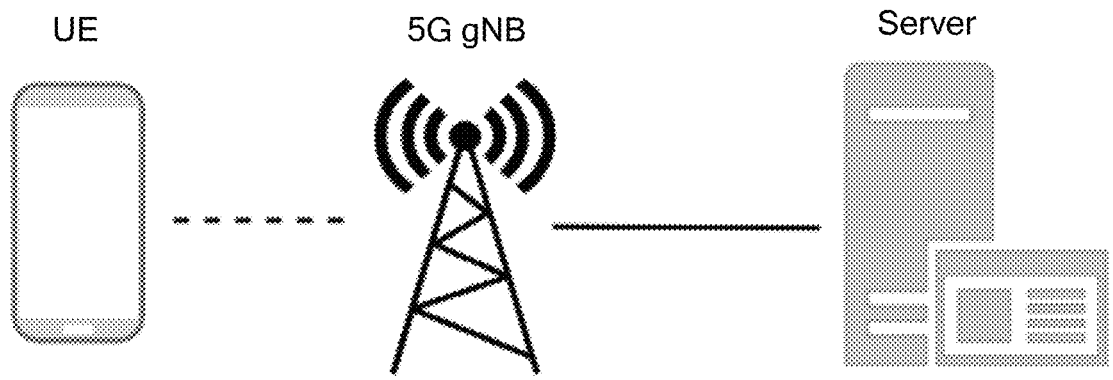
FIG. 1 is a schematic diagram of an existing proxy deployment solution.
Figure 2:
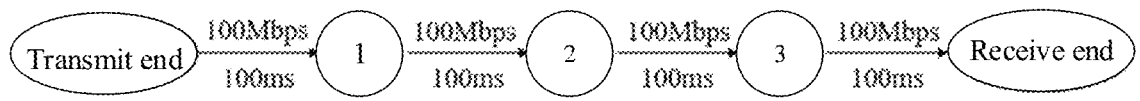
FIG. 2 is a diagram of a test topology.

To verify the impacts of a number of proxy and a location of proxy for proxy deployment in a network on end-to-end transmission performance, the present disclosure uses the test topology shown in FIG. 2, in which five docker containers are used to simulate five network nodes. The bandwidth and latency of each link are set to 100 Mbps and 100 ms, respectively. Proxy deployment solutions having different number of proxies deployed at different locations are tested simply. The Sender represents a transmit end; the Receiver represents a receive end; and three nodes (1, 2, and 3) between Sender and Receiver are used as network nodes on which a proxy can be selectively deployed. P (namely, proxy Proxy) is used to represent a network node on which a proxy is deployed; and R (namely, router Router) is used to represent a network node on which no proxy is deployed.

The present disclosure enumerates all feasible proxy deployment solutions. As shown in Table 1 below, there are eight solutions in which zero, one, two, and three proxies are deployed at different locations, respectively.

TABLE 1

| All Test Solutions of Three Nodes | |
|---|---|
| No proxy | Sender-Router1-Router2-Router3-Receiver: denoted by R01-R02-R03. |
| One proxy at different locations | Sender-Proxy-Router1-Router2-Receiver: denoted by P11-R12-R13. |
| | Sender-Router1-Proxy-Router2-Receiver: denoted by R21-P22-R23. |
| | Sender-Router1-Router2-Proxy-Receiver: denoted by R31-R32-P33. |
| Two proxies at different locations | Sender-Proxy1-Router-Proxy2-Receiver: denoted by P41-R42-P43. |
| | Sender-Proxy1-Proxy2-Router-Receiver: denoted by P51-P52-R53. |
| | Sender-Router-Proxy1-Proxy2-Receiver: denoted by R61-P62-P63. |
| Three proxies at different locations | Sender-Proxy1-Proxy2-Proxy3-Receiver: denoted by P71-P72-P73. |

Figure 3:
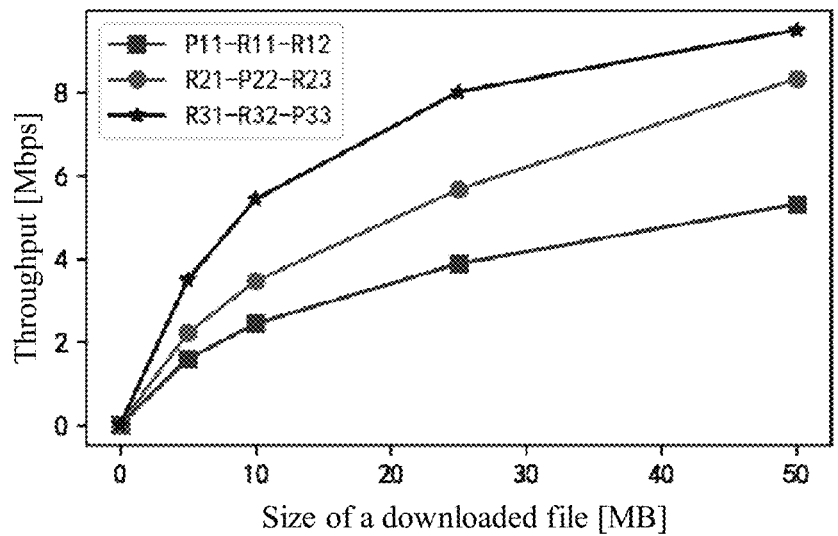
FIG. 3 is a throughput comparison diagram of one proxy at different locations.
Figure 4:
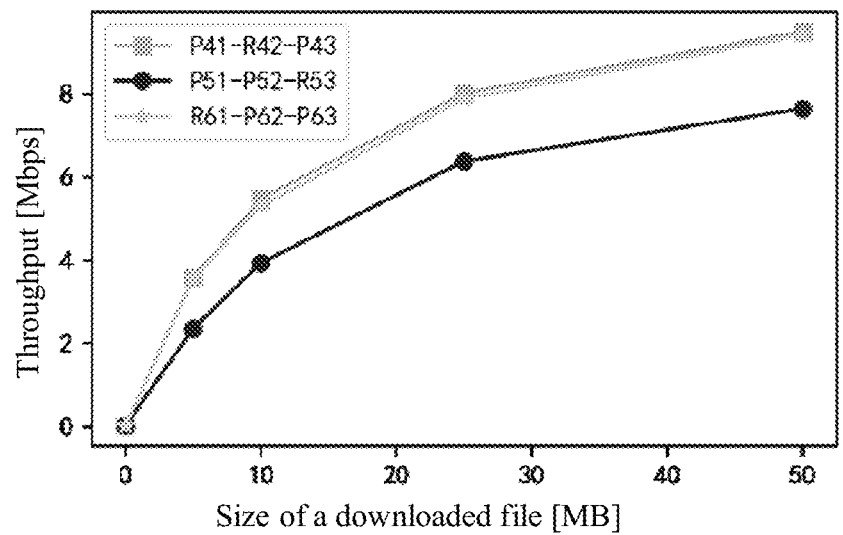
FIG. 4 is a throughput comparison diagram of two proxies at different locations.
Figure 5:
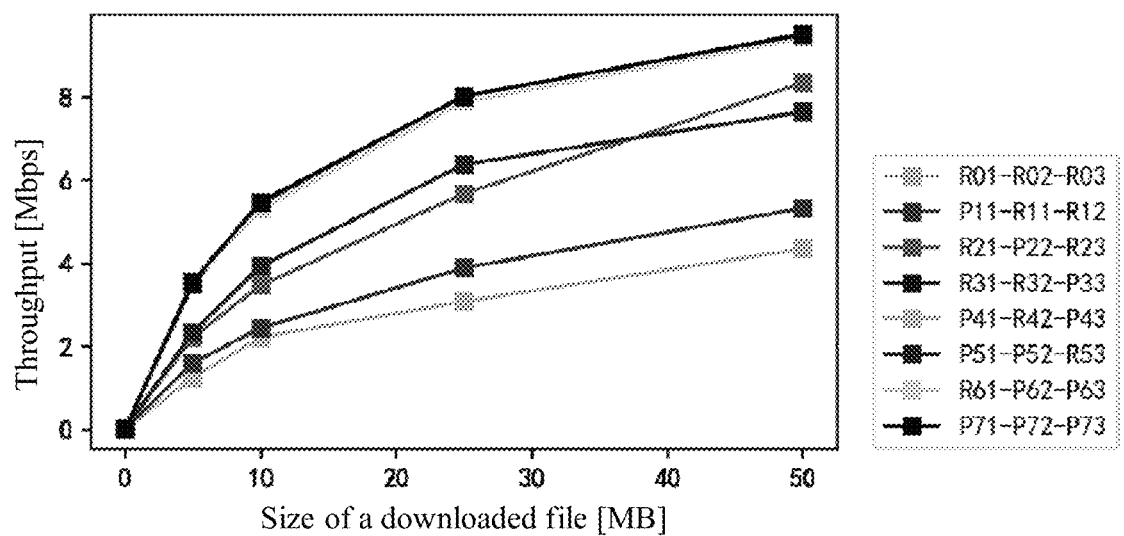
FIG. 5 is a throughput comparison diagram of all proxy deployment solutions.

According to the present disclosure, a bandwidth and a latency of each link are set to 100 Mbps and 100 ms, respectively. The links transmit data of 5 MB, 10 MB, 25 MB, and 50 MB sequentially. FIG. 3 to FIG. 5 show results of comparison among the throughput of the eight deployment solutions.

The results in FIG. 3 to FIG. 5 show that: (1) compared with a network node on which no proxy is deployed, a network node on which a proxy is deployed has higher transmission performance; (2) both a number of proxy and a location of proxy for proxy deployment impact transmission performance by different degrees; and (3) different deployment solutions may have identical gains in the transmission performance, for example, R31-R32-P33, P41-R42-P43, R61-P62-P63, and P71-P72-P73 implement identical gains in transmission performance. Therefore, the hierarchical proxy deployment method in the present disclosure takes into account both the number of proxies and the location of the proxies.

Therefore, the following is a key problem to be resolved in the present disclosure: how to design a better proxy deployment solution for a service flow of a particular type in a 5G/B5G network, thereby meeting the transmission performance requirement of an application by optimizing a number of proxy and a location of proxy for proxy deployment.

In a 5G/B5G network, a service provider considers that cloudification is an inevitable course of evolving a 5G/B5G core network. Network functions virtualization (NFV) and service function chains (SFC), which are capable of providing flexible services for users in an on-demand manner and reducing capital and operating expenses, have been widely deployed in 5G/B5G core network, where the services include flexibly setting a location of proxy and a number of proxy for cloud node deployment. In addition, a cloudified network node may provide an almost infinite network capacity and a relatively high data transmission rate, thereby effectively reducing a data transmission latency. Compared with a conventional proxy deployment solution having an inflexible location and number of proxy, cloudification brings more possibilities for a location of proxy and a number of proxy for proxy deployment.

Figure 6:
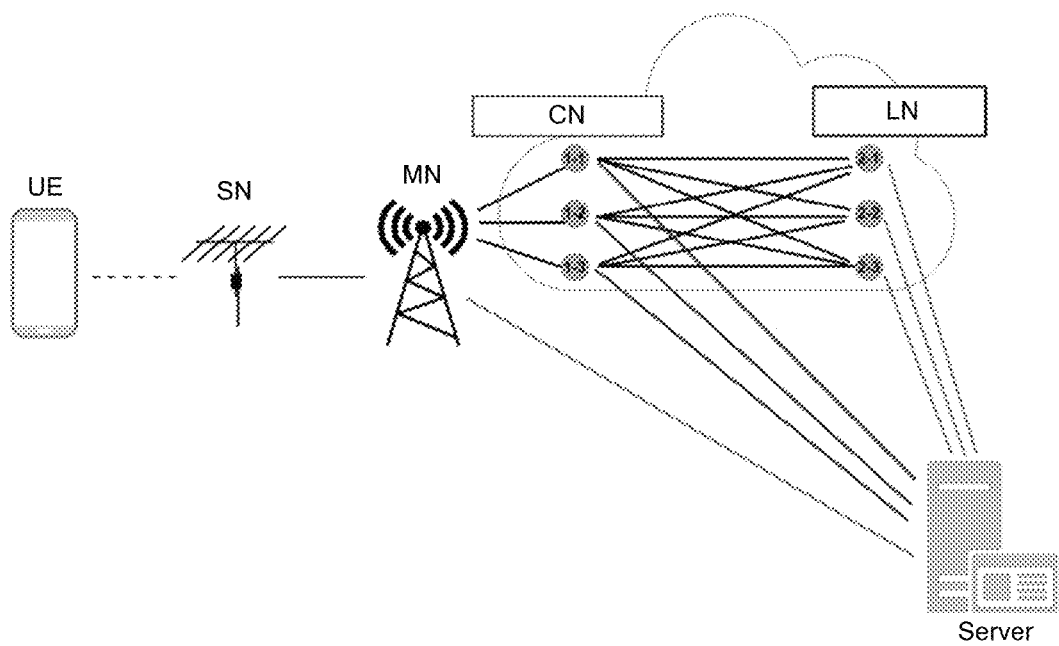
FIG. 6 is a diagram of a hierarchical proxy deployment architecture.

The hierarchical proxy deployment method in the present disclosure depends on a hierarchical proxy deployment architecture. The structure of the hierarchical proxy deployment architecture is shown in FIG. 6.

The present disclosure aims to implement a UE-Server service request. Therefore, in the present disclosure, two nodes, a master node (MN) and a secondary node (SN), on which proxies can be deployed are provided first based on an existing non-standalone mmWave-LTE mixed network architecture. Then, an almost infinite network capacity and a relatively high data transmission rate are provided by enabling a backend cloud (a core network) to be used as a cloud service node and a virtual network function (VNF) capable of flexibly providing a network service, thereby effectively reducing a data transmission latency.

Based on this, the present disclosure provides two cloudified nodes, namely, a cloud proxy node (CN) used for reducing data transmission latency and a long connection proxy node (LN) used for reducing a time to first byte (TTFB) in a long connection establishment process, thereby improving transmission performance of a long connection service flow.

Therefore, "hierarchical" in the present disclosure means that different number of proxies can be deployed at different locations of network nodes of different types. As shown in FIG. 6, all of SN, MN, CN, and LN are different network nodes on which proxies can be deployed, that is, a hierarchical proxy deployment architecture is formed.

For ease of understanding, a specific node is used in the present disclosure as an example for description. SN and MN represent a secondary node and a master node, respectively, and sub-nodes 1-1, 1-2, and 1-3 are optional cloud nodes CN on which proxies are deployed. If a service flow using a long connection needs to be taken into consideration, sub-nodes 2-1, 2-2, and 2-3 are optional cloud proxy nodes LN used for maintaining the long connection. Based on the above proxy nodes that may be deployed, three hierarchical proxy deployment manners are formed. The location of proxy and a number of proxy for proxy deployment can be selected flexibly based on a specific index of a transmission performance requirement of the service of a particular type in a specific 5G/B5G network. If a flow needs to use a long connection, a proxy deployment solution UE-SN-MN-CN(1-2)-LN(2-3)-Server may be used. To use the long connection, a proxy needs to be deployed at an LN. Certainly, another proxy needs to be deployed at a CN. However, whether to deploy proxies at the SN and the MN depends on whether the transmission performance requirement of the service flow is met.

Compared with an existing proxy deployment manner of deploying a predetermined number of proxies at a fixed location, the architecture-based hierarchical proxy deployment manner according to the present disclosure has the following advantage: The location of proxy and the number of proxy for proxy deployment can be considered more flexibly, and the transmission performance of a network can be enhanced more effectively, thereby meeting a transmission performance requirement of a service flow in a 5G/B5G network.

The above hierarchical deployment manner provides an architecture for proxy deployment. However, for a transmission performance requirement of a particular service, the following is still a problem to be resolved in the present disclosure: how to provide an optimal proxy deployment solution for the service flow, that is, select an optimal location of proxy and a number of proxy for proxy deployment on the above proxy deployment architecture, thereby meeting the transmission performance requirement of the service flow. For a deployment number of proxy, problems of a network resource load and energy consumption are taken into consideration in the present disclosure, such that it is expected to meet the transmission performance requirement by using fewer proxies. For a deployment location, the optional proxy nodes, including the SN, the MN, the CN, and the LN, in the above hierarchical proxy deployment architecture are taken into consideration in the present disclosure, such that a proxy deployment location meeting the requirement can be selected based on the transmission requirement of the particular service flow.

The present disclosure adopts the following specific technical solutions.

Figure 7:
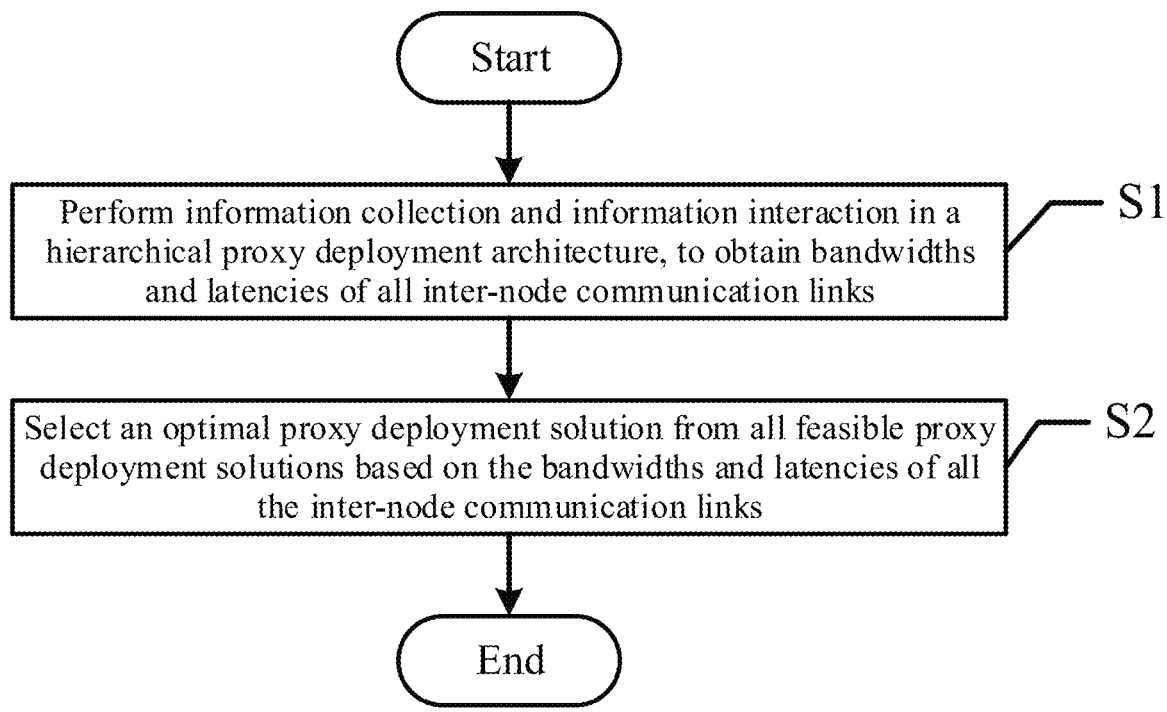
FIG. 7 is a flowchart of a hierarchical proxy deployment method.

As shown in FIG. 7, a hierarchical proxy deployment method is provided, including the following steps:

S1: Perform information collection and information interaction in a hierarchical proxy deployment architecture to obtain bandwidths and latencies of all inter-node communication links.

The hierarchical proxy deployment architecture in step S1 includes a secondary base station node SN, a master base station node MN, a cloud proxy node CN, and a long connection proxy node LN.

The secondary base station node SN establishes a communication connection with the master base station node MN and user equipment UE separately. The master base station node MN establishes a communication connection with the cloud proxy node CN. The cloud proxy node CN establishes a communication connection with the long connection proxy node LN. A server Server establishes a communication connection with the master base station node MN, the cloud proxy node CN, and the long connection proxy node LN separately.

The cloud proxy node CN includes a plurality of cloud proxy sub-nodes, and the long connection proxy node LN includes a plurality of long connection proxy sub-nodes.

Each cloud proxy sub-node establishes a communication connection with the master base station node MN and a persistent communication connection with each long connection proxy sub-node separately, and the server Server establishes a communication connection with each cloud proxy sub-node and each long connection proxy sub-node separately.

Step S1 includes the following sub-steps:

S11: Collect bandwidths and latencies of communication links between all adjacent nodes in the hierarchical proxy deployment architecture by using the master base station node MN, the cloud proxy node CN, and the long connection proxy node LN in the hierarchical proxy deployment architecture.

S12: Notify all nodes of the bandwidths and latencies of all the communication links by using the master base station node MN, the cloud proxy node CN, and the long connection proxy node LN.

S2: Select an optimal proxy deployment solution from all feasible proxy deployment solutions based on the bandwidths and latencies of all the inter-node communication links.

Step S2 includes the following sub-steps.

S21: Select a set of candidate solutions from all the feasible proxy deployment solutions based on the bandwidths and latencies of all the communication links.

Step S21 includes the following sub-steps.

S211: Enumerate all the feasible proxy deployment solutions according to an enumeration method after the user equipment UE sends a service request to the server Server.

S212: Obtain transmission performance, the minimum throughput of the communication links and a time to first byte (TTFB), of all proxy deployment solutions based on the bandwidths and latencies of all the communication links, a minimum throughput of the communication links, and a time to first byte TTFB.

In this embodiment, transmission performance includes bandwidth, data transmission rate, and latency.

The calculation formula of the time to first byte TTFB in step S212 is:

$$TG=2D+2 \max(D_i), \text{ where}$$

TG denotes the time to first byte TTFB, D denotes the delay of the entire end-to-end transmission link, and $D_i$ denotes the delay of a link between every two adjacent nodes.

S213: Exclude the proxy deployment solutions whose transmission performance does not meet the transmission performance requirements of network applications and generate the set of feasible candidate solutions by using the rest of the proxy deployment solutions.

Step S213 specifically includes deleting a proxy deployment solution having an inadequate bandwidth, deleting a proxy deployment solution having a low data transmission rate, and deleting a proxy deployment solution having a long latency.

S22: Delete the optimal proxy deployment solution from the set of candidate solutions.

In this embodiment, a proxy deployment solution is selected according to the optimal selection method in steps S221 to S224.

Step S22 includes the following sub-steps:

S221: In a case that a proxy deployment with minimizing the number of proxies and network overheads as the goal, select, from the set of candidate solutions, firs the proxy deployment solutions with the minimum number of proxies and network overheads to obtain a first filtered set.

S222: In a case that the cloud proxy node CN is taken as a condition, select, from the first filtered set, second the proxy deployment solutions passing the cloud proxy node CN to obtain a second filtered set.

In this embodiment, a proxy deployment solution having a cloud proxy node CN is the preferred selection in step S222. If no cloud proxy node CN is required, skip step S222 and perform step S223. A cloud proxy node CN is the preferred choice for consideration of a proxy deployment location to reduce data transmission latency as much as possible by using a relatively great network bandwidth on a cloud.

S223: In a case that the long connection proxy node LN is taken as a condition, select, from the second filtered set, third the proxy deployment solutions to obtain a third filtered set, where the third proxy deployment solutions do not need to use the persistent connection between the cloud proxy node CN and the long connection proxy node LN.

In this embodiment, it is preferred that a proxy deployment solution having a long connection proxy node LN is not used. If a long connection proxy node LN is required, skip step S223 and perform step S224. Taking into consideration whether the service flow needs to use a long connection proxy node LN, a solution requiring no long connection proxy node LN is preferred when possible, thereby reducing extra network overheads caused by using a long connection.

S224: Select one proxy deployment solution, namely, the optimal proxy deployment solution from the third filtered set.

In step S224, the proxy deployment solution selected from the third filtered set is the optimal proxy deployment solution.

In this embodiment, a communication link specifically refers to a link between adjacent nodes, and a transmission link is a link for implementing a request sent by the user equipment UE to the server Server (a transmission link needs to be matched with a plurality of communication links).

What is claimed is:

1. A hierarchical proxy deployment method, comprising the following steps:
    S1: performing information collection and information interaction in a hierarchical proxy deployment architecture to obtain bandwidths and latencies of all inter-node communication links; and
    S2: selecting an optimal proxy deployment solution from all possible proxy deployment solutions based on the bandwidths and latencies of all the inter-node communication links;
    wherein the hierarchical proxy deployment architecture in step S1 comprises a secondary base station node, a master base station node, a cloud proxy node, and a long connection proxy node; and
    the secondary base station node establishes a communication connection with the master base station node and user equipment separately; the master base station node establishes a communication connection with the cloud proxy node; the cloud proxy node establishes a communication connection with the long connection proxy node; and a server establishes a communication connection with the master base station node, the cloud proxy node, and the long connection proxy node separately.

2. The hierarchical proxy deployment method according to claim 1, wherein the cloud proxy node comprises a plurality of cloud proxy sub-nodes, and the long connection proxy node comprises a plurality of long connection proxy sub-nodes; and each cloud proxy sub-node establishes a communication connection with the master base station node and a persistent communication connection with each long connection proxy sub-node separately; and the server establishes a communication connection with each cloud proxy sub-node and each long connection proxy sub-node separately.

3. The hierarchical proxy deployment method according to claim 1, wherein step S1 comprises the following sub-steps:

S11: collecting bandwidths and latencies of communication links between all adjacent nodes in the hierarchical proxy deployment architecture by using the master base station node, the cloud proxy node, and the long connection proxy node in the hierarchical proxy deployment architecture; and S12: notifying all nodes of the bandwidths and latencies of all the communication links by using the master base station node, the cloud proxy node, and the long connection proxy node.

4. The hierarchical proxy deployment method according to claim 1, wherein step S2 comprises the following sub-steps:

S21: selecting a set of feasible candidate solutions from all the possible proxy deployment solutions based on the bandwidths and latencies of all the communication links; and S22: selecting the optimal proxy deployment solution from the set of feasible candidate solutions.

5. The hierarchical proxy deployment method according to claim 4, wherein step S21 comprises the following sub-steps:

S211: enumerating all the possible proxy deployment solutions according to an enumeration method after the user equipment sends a service request to the server;

S212: obtaining transmission performance, the minimum throughput of the communication links and a time to first byte (TTFB), of all possible proxy deployment solutions based on the bandwidths and latencies of all the communication links; and S213: excluding proxy deployment solutions incapable of meeting the transmission performance requirements of network applications and generating the set of feasible candidate solutions comprising the rest proxy deployment solutions.

6. The hierarchical proxy deployment method according to claim 5, wherein a calculation formula of the TTFB in step S212 is:

$TG=2D+2 \max(D_i)$, wherein

TG denotes the TTFB, D denotes a delay of an entire end-to-end transmission link, and $D_i$ denotes a delay in a link between every two adjacent nodes.

7. The hierarchical proxy deployment method according to claim 4, wherein step S22 comprises the following sub-steps:

S221: in a case that a proxy deployment with minimizing the number of proxies and network overheads as a goal, selecting, from the set of feasible candidate solutions, first proxy deployment solutions with a minimum number of proxies and network overheads to obtain a first filtered set;

S222: in a case that the cloud proxy node is taken as a condition, selecting, from the first filtered set, second proxy deployment solutions passing the cloud proxy node to obtain a second filtered set;

S223: in a case that the long connection proxy node is taken as a condition, selecting, from the second filtered set, third the proxy deployment solutions to obtain a third filtered set, wherein the third proxy deployment solutions do not need to use the persistent connection between the cloud proxy node and the long connection proxy node; and S224: selecting one proxy deployment solution as the optimal proxy deployment solution from the third filtered set.

* * * * *